United States Patent
Zeniya

(10) Patent No.: US 11,503,083 B2
(45) Date of Patent: Nov. 15, 2022

(54) CALL PROCESSING SERVER, CALL PROCESSING METHOD, AND CALL PROCESSING PROGRAM

(71) Applicant: Nippon Telegraph and Telephone Corporation, Tokyo (JP)

(72) Inventor: Yoshihiko Zeniya, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/428,220

(22) PCT Filed: Jan. 23, 2020

(86) PCT No.: PCT/JP2020/002217
§ 371 (c)(1),
(2) Date: Aug. 3, 2021

(87) PCT Pub. No.: WO2020/162192
PCT Pub. Date: Aug. 13, 2020

(65) Prior Publication Data
US 2022/0109703 A1  Apr. 7, 2022

(30) Foreign Application Priority Data
Feb. 6, 2019 (JP) .............................. JP2019-019491

(51) Int. Cl.
*H04L 65/1046* (2022.01)
*H04L 65/102* (2022.01)
*H04L 65/1104* (2022.01)

(52) U.S. Cl.
CPC ........ *H04L 65/1046* (2013.01); *H04L 65/102* (2013.01); *H04L 65/1104* (2022.05)

(58) Field of Classification Search
CPC combination set(s) only.
See application file for complete search history.

(56) References Cited

U.S. PATENT DOCUMENTS

2020/0204962 A1* 6/2020 Hua ...................... H04W 48/18

FOREIGN PATENT DOCUMENTS

| JP | 2014087031 |   | 5/2014  |
|----|------------|---|---------|
| JP | 2015156541 | * | 8/2015  |
| JP | 2016163225 | * | 9/2016  |
| JP | 2016213697 | * | 12/2016 |

* cited by examiner

*Primary Examiner* — Phung-Hoang J Nguyen
(74) *Attorney, Agent, or Firm* — Fish & Richardson P.C.

(57) ABSTRACT

In a case where there are a plurality of query destination servers, the number of queries to determine a connection destination network is reduced and the load in call processing is reduced. The call processing server 1 includes a destination resolution storage unit 13 that stores a telephone number and a query order of a query made to at least one server until a connection destination network for the telephone number is acquired; and a call processing unit 11 that acquires a query order corresponding to a telephone number of an incoming-call destination specified in a call request from the destination resolution storage unit, makes a query to a server set at the end of the acquired query order to acquire a connection destination network for the telephone number of the incoming-call destination, and transmits the call request to the connection destination network.

6 Claims, 4 Drawing Sheets

| INCOMING PHONE NUMBER | QUERY ORDER TO SERVER |
|---|---|
| 0120-xxxx-x111 | 1)AS 2)ENUM |
| 0120-xxxx-y222 | 1)AS |
| 050-xxxx-zz33 | 1)HSS |
| 050-xxxx-aa44 | 1)HSS 2)ENUM |
| ····· | ····· |

Fig. 2

| INCOMING PHONE NUMBER | QUERY ORDER TO SERVER |
|---|---|
| 0120-xxxx-x111 | 1)AS 2)ENUM |
| 0120-xxxx-y222 | 1)AS |
| 050-xxxx-zz33 | 1)HSS |
| 050-xxxx-aa44 | 1)HSS 2)ENUM |
| ..... | ..... |

CALL PROCESSING SERVER, CALL PROCESSING METHOD, AND CALL PROCESSING PROGRAM

CROSS-REFERENCE TO RELATED APPLICATIONS

This application is a National Stage application under 35 U.S.C. § 371 of International Application No. PCT/JP2020/002217, having an International Filing Date of Jan. 23, 2020, which claims priority to Japanese Application Serial No. 2019-019491, filed on Feb. 6, 2019. The disclosure of the prior application is considered part of the disclosure of this application, and is incorporated in its entirety into this application.

TECHNICAL FIELD

The present invention relates to a call processing server, a call processing method, and a call processing program that perform call processing such as for outgoing and incoming calls.

BACKGROUND ART

With the spread of IP-based communication services typified by the Internet, there is a shift to the form of providing telephone services on the IP network. In a telephone service, in order for users of different telecommunications carriers (communication carriers) to make a call, it is necessary to connect different telecommunications carrier networks to each other. In the interconnection between different telecommunications carriers, the shift from connection via the PSTN to interconnection in the IP network (IP interconnection) is in progress.

Further, various studies have been conducted on the prediction of communication traffic (PTL 1).

CITATION LIST

Patent Literature

[PTL 1] Japanese Patent Application Publication No. 2014-87031

SUMMARY OF THE INVENTION

Technical Problem

Conventionally, in response to receiving a call from a subscriber, a call processing server makes a query to another server of its own company, such as an HSS server managed by its own telecommunications carrier, to determine a connection destination network for the destination telephone number. In the future, when IP interconnection with another telecommunications carrier is made, it is also necessary to make a query to an ENUM server that resolves the corresponding number in the network of the other telecommunications carrier. In a case where there are a plurality of query destination servers, the number of queries to determine the connection destination network increases, and accordingly, the load on the call processing server increases.

The present invention has been made in view of the above circumstances, and an object of the present invention is to reduce the number of queries to determine the connection destination network and to reduce the load in call processing in a case where there are a plurality of query destination servers.

Means for Solving the Problem

In order to achieve the above object, one aspect of the present invention is a call processing server including a destination resolution storage unit that stores a telephone number and a query order of a query made to at least one server until a connection destination network for the telephone number is acquired; and a call processing unit that acquires a query order corresponding to a telephone number of an incoming-call destination specified in a call request from the destination resolution storage unit, makes a query to a server set at the end of the acquired query order to acquire a connection destination network for the telephone number of the incoming-call destination, and transmits the call request to the connection destination network.

One aspect of the present invention is a call processing method implemented by a call processing server including a destination resolution storage unit that stores a telephone number and a query order of a query made to at least one server until a connection destination network for the telephone number is acquired. The call processing method includes an acquisition step of acquiring a query order corresponding to a telephone number of an incoming-call destination specified in a call request from the destination resolution storage unit; and a call processing step of making a query to a server set at the end of the acquired query order to acquire a connection destination network for the telephone number of the incoming-call destination, and transmitting the call request to the connection destination network.

The present invention is a call processing program for causing a computer to function as the call processing server.

Effects of the Invention

According to the present invention, it is possible to reduce the number of queries to determine a connection destination network and to reduce the load in call processing in a case where there are a plurality of query destination servers.

BRIEF DESCRIPTION OF DRAWINGS

FIG. 2 illustrates an example of a destination solution storage unit.

DESCRIPTION OF EMBODIMENTS

An embodiment of the present invention will be described below with reference to the drawings.

Figure 1:
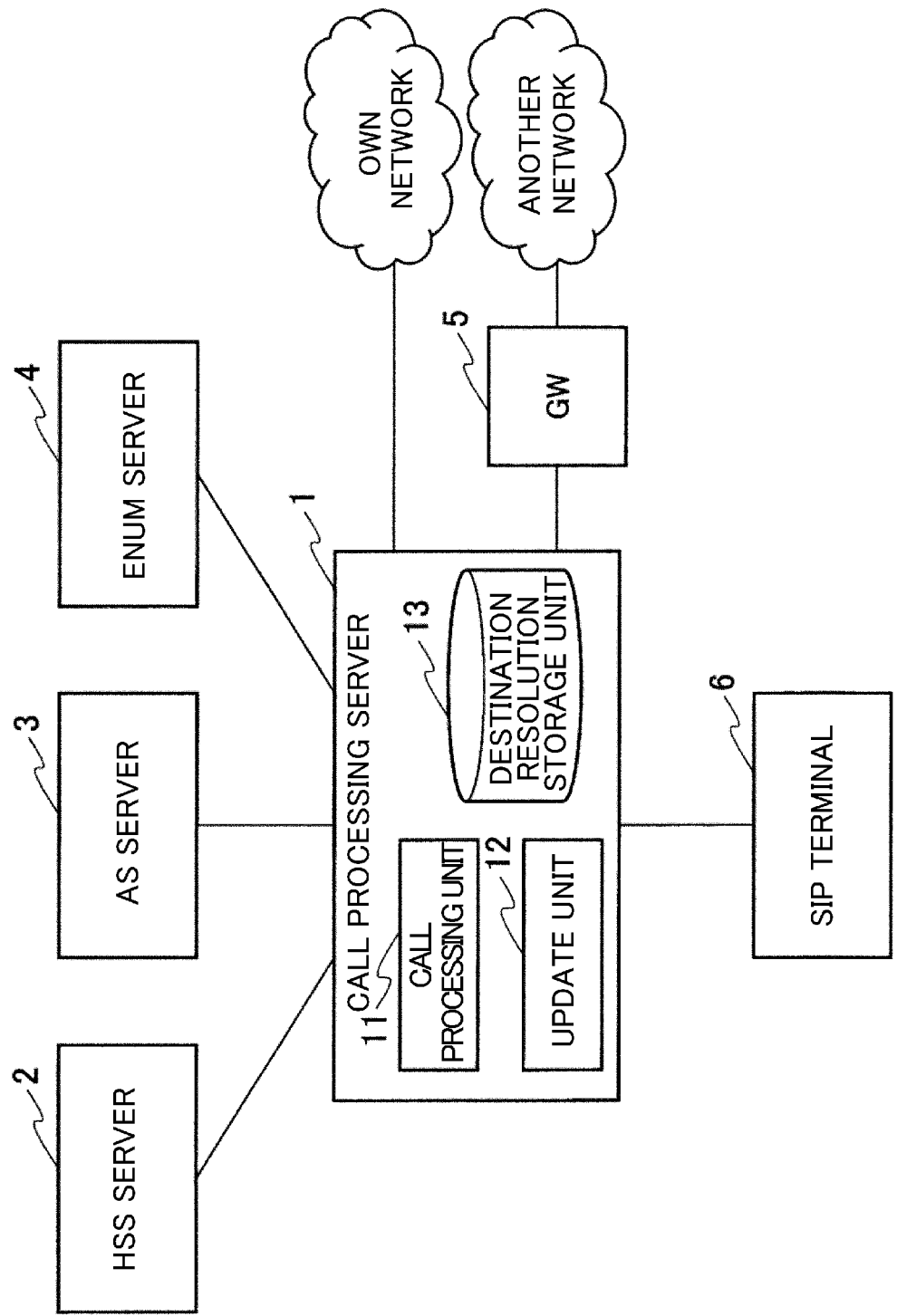
FIG. 1 is a diagram illustrating whole configuration of a call processing system according to an embodiment of the present invention.

FIG. 1 is a system configuration diagram illustrating the whole call processing system according to the embodiment of the present invention. The illustrated call processing system includes a call processing server 1, a plurality of query destination servers 2 to 4, a gateway (GW) 5, and a SIP terminal 6.

The call processing server 1 is a server that performs call processing (call control) such as for outgoing and incoming calls. In the present embodiment, in response to receiving a call request from the SIP terminal 6, the call processing server 1 makes a query to the query destination servers 2 to 4 about a connection destination network for an incoming-call destination telephone number specified in the call request. The call processing server 1 is connected to its own network, which is the network of its own telecommunications carrier, and is also connected to another network, which is the network of another telecommunications carrier, via the gateway 5. The gateway 5 is a device for connecting to another network having a different protocol.

The query destination servers 2 to 4 of the present embodiment are an HSS (Home Subscriber Server) server 2 and an AS (Application Server) server 3 that both hold subscriber information of their own telecommunications carrier, and an ENUM (E.164 NUmber Mapping) server 4 that holds number portability information on its own company's management numbers. Here, the number portability information on company's management numbers is information in which telephone numbers assigned to and managed by the telecommunications carrier are associated with other telecommunications carriers to which the subscribers of its own telecommunications carrier who use the telephone numbers have changed their subscription carrier without changing their telephone numbers. In other words, the number portability information is information for managing the company's management numbers corresponding to telephone numbers of other telecommunications carriers which have been turned under the number portability system.

When the ENUM server 4 receives a query about a company's management number, the ENUM server 4 responds to the call processing server 1 with information on the other telecommunications carrier which is the number portability destination of the telephone number.

When the ENUM server 4 receives a query about a telephone number other than the company's management numbers, that is, a telephone number of another telecommunications carrier, the ENUM server 4 makes a query to the other company's ENUM server (not illustrated) managed by the other company. The other company's ENUM server responds to the ENUM server 4 with the number portability information on the other company's management numbers held by itself, the identification information of a connection destination network acquired from another company's HSS server or another company's AS, or the like. Then, the ENUM server 4 responds to the call processing server with the number portability information on the other company's management number or the identification information of the connection destination network, acquired from the ENUM server of the other company.

Further, one ENUM server may be shared by the telecommunications carriers instead of ENUM servers being owned individually by the telecommunications carriers. In that case, the ENUM server holds number portability information related to management numbers of each company.

The HSS server 2 is a server that holds subscriber information (telephone number, identification information of the connection destination network, etc.) of a telephone number series (telephone number system) with 0AB to J of its own telecommunications carrier. The HSS server 2 may also hold subscriber information of a telephone number series for IP telephone starting with 050 of its own communication carrier.

The AS server 3 is a server that holds subscriber information (telephone number, identification information of the connection destination network, etc.) of a telephone number series (with e.g., 0120, 0800, 0570, etc.) for additional services of its own telecommunications carrier. The additional services include incoming call billing services (0120, 0800) such as Free Dial (registered trademark), and caller payment services (0570) such as Navi Dial (registered trademark). The AS server 3 may also hold subscriber information of a telephone number series for shortened dial starting with 188 or 189.

The ENUM server 4 is a server that associates telephone numbers with number portability information, and resolves numbers of other networks. The ENUM server 4 of the present embodiment holds number portability information of a telephone number series with 0AB to J and a telephone number series for additional services (e.g., 0120, 0800, 0570, etc.). The number portability information includes telephone numbers, identification information of the connection destination networks of relocation destination carriers, and the like. The ENUM server 4 may also hold address information of a telephone number series (090, 080, 070, etc.) for mobile phone. In addition, the ENUM server 4 acquires information (such as identification information of the connection destination network) related to the telephone number of the other telecommunications carrier indicated by the query from the other company's ENUM server. Further, the ENUM server 4 may hold portability information of a telephone number series for IP telephone starting with 050 of its own communication carrier.

The SIP terminal 6 is a communication terminal that communicates with another SIP terminal (not illustrated), and transmits a call request specifying the telephone number of the incoming-call destination SIP terminal to the call processing server 1.

Conventionally, the HSS server 2 holds subscriber information of telephone numbers in 0AB-to-J format of its own telecommunications carrier, and the AS server 3 holds subscriber information of additional services of its own telecommunications carrier. Accordingly, the call processing server 1 can acquire the identification information of the connection destination network by making a query to the HSS if the destination phone number in a call request from the SIP terminal 6 is a phone number in 0AB-to-J format, and by making a query to the AS server 3 if the destination phone number is a phone number for an additional service. Thus, if the telephone number is known, the query destination server is uniquely determined.

However, as in the present embodiment illustrated in FIG. 1, the ENUM server 4 involves the IP interconnection with another telecommunications carrier. The ENUM server 4 holds the number portability information of telephone numbers in 0AB-to-J format and the number portability information of the telephone numbers for the additional services. Further, the ENUM server 4 acquires information on telephone numbers of the other telecommunications carriers from the other company's ENUM server. In this case, the call processing server 1 cannot know from only a telephone number whether it is the telephone number of a subscriber of its own telecommunications carrier, the telephone number subjected to the number portability to another telecommunications carrier, or the telephone number of a subscriber of the other telecommunications carrier. For example, if the incoming-call destination telephone number in a call request is in 0AB-to-J format, the call processing server cannot identify whether it is a telephone number of its own telecommunications carrier or a telephone number of another telecommunications carrier. As a result, it is necessary to make a query to either the HSS server 2 that holds the subscriber information of its own telecommunications carrier or the ENUM server 4, and if one server has no corresponding telephone number, a query is made to the other server.

In the present embodiment, the number of queries is reduced by using a query history (destination resolution history) to the query destination servers 2 to 4.

Next, the call processing server 1 will be described. The call processing server 1 illustrated in FIG. 1 includes a call processing unit 11, an update unit 12, and a destination resolution storage unit 13.

The call processing unit 11 acquires from the destination resolution storage unit 13 a query order corresponding to the telephone number of the incoming-call destination specified in the call request transmitted from the SIP terminal 6. Further, the call processing unit 11 makes a query to the query destination servers 2 to 4 set at the end of the acquired query order to acquire a connection destination network for the telephone number of the incoming-call destination, and transmits a call request to the connection destination network. The update unit 12 stores the order of the query destination servers 2 to 4 to which queries have been made until the call processing unit 11 acquires the connection destination network in a query destination order corresponding to the telephone number of the incoming-call destination of the destination resolution storage unit 13.

The destination resolution storage unit 13 stores a telephone number and a query order of a query made to at least one query destination server 2 to 4 until the connection destination network for the telephone number is acquired. Specifically, the destination resolution storage unit 13 stores as a history for each telephone number the identification information (name, ID, etc.) and the order of the query destination servers 2 to 4 to which the call processing unit 11 has been actually connected until the destination is resolved.

FIG. 2 illustrates an example of the destination resolution storage unit 13. In the illustrated destination resolution storage unit 13, a telephone number and a query order of a query made to the query destination servers 2 to 4 are stored in association with each other. It illustrates that when the telephone number of the incoming-call destination is, for example, 0120-xxxx-x111, the call processing unit 11 first makes a query to the AS server 3 in the previous call processing to acquire the connection destination network for that telephone number but fails to acquire the connection destination network for the telephone number from the AS server 3, thus secondly makes a query to the ENUM server 4, and successfully acquires the connection destination network for the telephone number from the ENUM server 4. In this case, since the call processing unit 11 successfully acquires the connection destination network from the ENUM server 4, it indicates that the query to the first AS server 3 is missed.

Further, it illustrates that when the telephone number of the incoming-call destination is 050-xxxx-zz33, the call processing unit 11 first makes a query to the HSS server 2 in the previous call processing to acquire the connection destination network for that telephone number and successfully acquires the connection destination network for the telephone number from the HSS server 2. In this case, it illustrates that the call processing unit 11 has made a query to the HSS server 2 efficiently without making a miss.

Figure 3:
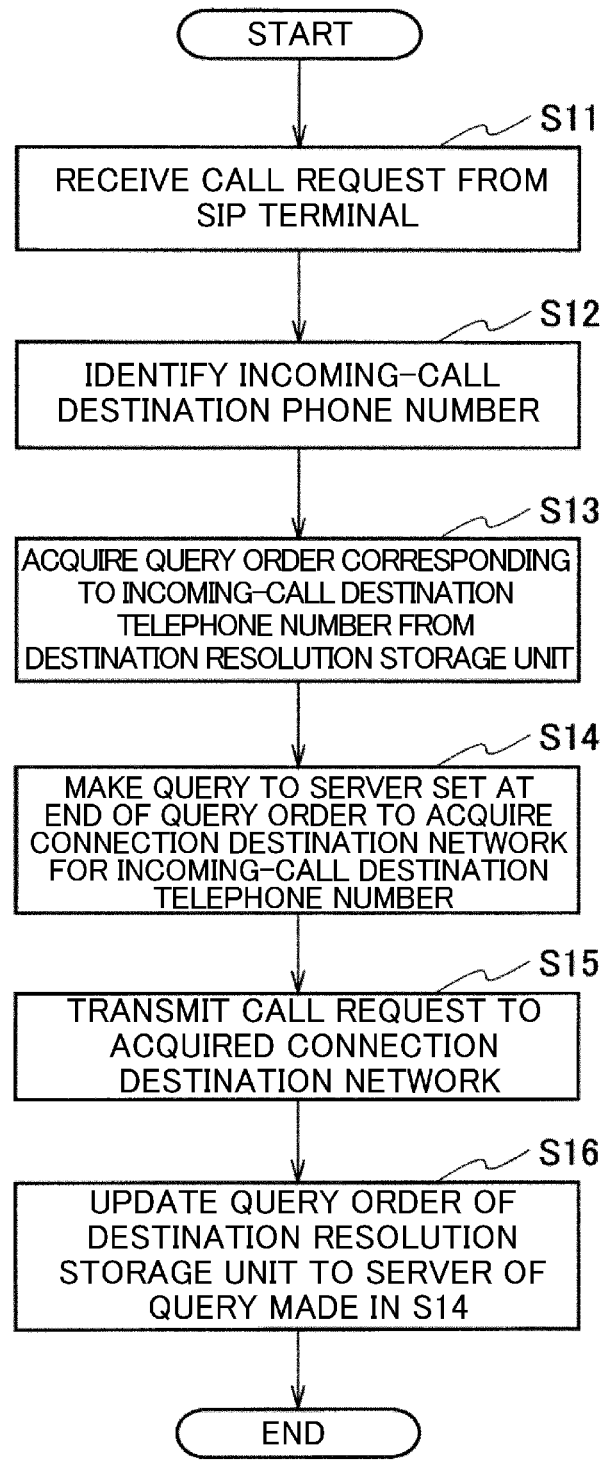
FIG. 3 is a flowchart illustrating call processing.

FIG. 3 is a flowchart illustrating call processing of the call processing server 1.

The call processing unit 11 of the call processing server 1 receives a call request from the SIP terminal 6 (step S11), and identifies the incoming-call destination telephone number specified in the call request (step S12).

Then, the call processing unit 11 searches the destination resolution storage unit 13 using the specified incoming-call destination telephone number as a search key to acquire the query order corresponding to the incoming-call destination telephone number (step S13).

Then, the call processing unit 11 makes a query about a connection destination network corresponding to the incoming-call destination telephone number to the query destination server set at the end of the acquired query order, and acquires the connection destination network (step S14). For example, when one of the query destination servers 2 to 4 set at the end of the query order is the ENUM server 4, the call processing unit 11 transmits a query request including the incoming-call destination telephone number to the ENUM server 4. If the ENUM server 4 holds the identification information of the connection destination network for the incoming-call destination telephone number, the ENUM server 4 transmits the identification information of the connection destination network to the call processing server 1. The identification information of the connection destination network is, for example, a communication path, NRN: Network Routing Number, or the like.

The destination resolution storage unit 13 is set with the query order used in the previous (immediately before) call request corresponding to each incoming-call destination telephone number. For example, if the call processing server 1 first makes a query about a connection destination network for the incoming-call destination telephone number to the HSS server 2 in the previous call request but fails to acquire the connection destination network from the HSS server 2, then the call processing server 1 makes a query about the connection destination network to the ENUM server 4 and successfully acquires the connection destination network from the ENUM server 4.

In this case, in the destination resolution storage unit 13, the query order for the corresponding incoming-call destination telephone number is "First: HSS server, Second: ENUM server". The ENUM server 4 set at the end of the query order is the correct query destination server that can resolve the destination for the corresponding incoming-call destination telephone number. On the other hand, the server other than the ENUM server 4 set at the end of the query order, that is, the HSS server 2 set first is an erroneous query destination server that cannot resolve the destination for the corresponding incoming-call destination telephone number. Therefore, for the corresponding incoming-call destination telephone number, a query to the HSS server 2 is a missed, useless query.

In the present embodiment, a (missed) query to the unnecessary query destination server is reduced by making a query about a connection destination network for the incoming-call destination telephone number to the query destination server set at the end of the query order.

Note that in step S13, when the incoming-call destination telephone number in the call request is not stored in the destination resolution storage unit 13, that is, in the case of the first call processing for the incoming-call destination telephone number, the call processing unit 11 makes a query about a connection destination network to the query destination server in a predetermined order according to the number system of the incoming-call destination telephone number.

For example, when the number system of the incoming-call destination telephone number is 0AB to J, the call processing unit 11 first transmits a query request including the incoming-call destination telephone number to the HSS server 2. If the HSS server 2 holds the identification information of the connection destination network for the corresponding incoming-call destination telephone number, the HSS server 2 transmits the identification information of the connection destination network to the call processing server 1. If the HSS server 2 does not hold the identification information, the HSS server 2 responds to the call processing server 1 with a message indicating no identification information. If the HSS server 2 does not hold the identification information of the connection destination network, the call processing unit 11 then transmits a query request including the incoming-call destination telephone number to the ENUM server 4 in the predetermined order. In this case, since the ENUM server 4 basically holds the identification information of the connection destination network for the corresponding incoming-call destination telephone number, the ENUM server 4 responds to the call processing server 1 with the identification information (communication path, NRN, etc.) of the connection destination network.

Further, in step S14, when the connection destination network cannot be acquired from the query destination server set at the end of the query order acquired from the destination resolution storage unit 13, the call processing unit 11 makes a query about a connection destination network to another query destination server according to the number system of the incoming-call destination telephone number.

Then, the call processing unit 11 performs call processing for transmitting a call request to the connection destination network corresponding to the acquired identification information (step S15). Further, the update unit 12 updates the query order for the corresponding incoming-call destination telephone number in the destination resolution storage unit 13 (step S16). Specifically, the update unit 12 writes to the destination resolution storage unit 13 the query order (identification information of the query destination server, order) of queries that have been actually made in step S14 until the call processing unit 11 acquires the connection destination network. Note that if the query order before update and the query order after update are the same, the update unit 12 does not update the destination resolution storage unit 13.

Figure 4:
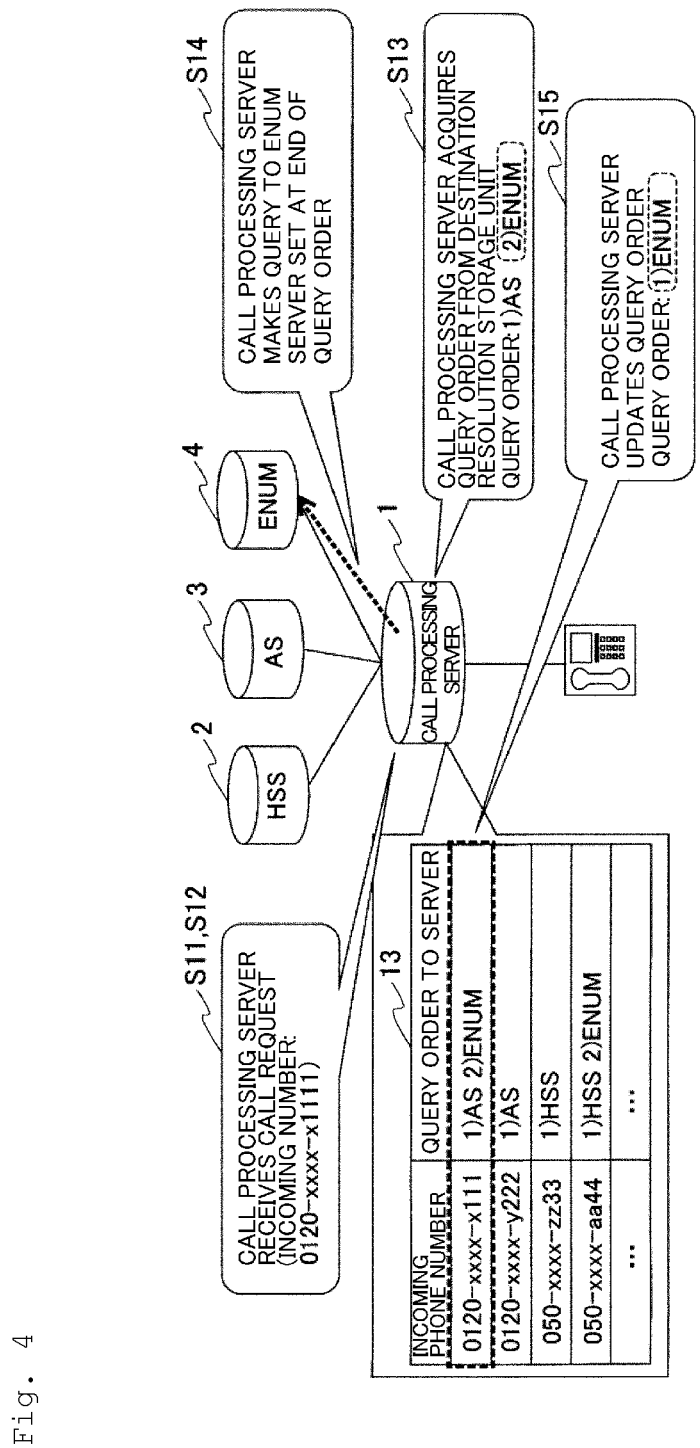
FIG. 4 is a diagram for explaining the call processing in detail.

FIG. 4 is a diagram for explaining the call processing described with reference to FIG. 3 in detail. In an illustrated example, the call processing server 1 receives a call request from the SIP terminal 6 and identifies the incoming-call destination telephone number (0120-xxx-x111) in the call request (steps S11 and 12). The call processing server 1 searches the destination resolution storage unit 13 using "0120-xxx-x111" as a search key to acquire a query order (First: AS server, Second: ENUM server) (step S13). The call processing server 1 makes q query to the ENUM server 4 set at the end of the query order to acquire the identification information of the connection network for the incoming-call destination telephone number (step S14), and transmits a call request to the connection destination network of the acquired identification information. The call processing server 1 writes the ENUM server 4 in the query made in step S14 in the query order of the destination resolution storage unit 13 to update the destination resolution storage unit (step S16). As a result, the query order corresponding to "0120-xxx-x111" in the destination resolution storage unit 13 is updated from "First: AS server, Second: ENUM server" to "First: ENUM server".

The call processing server 1 of the present embodiment described above includes the destination resolution storage unit that stores a telephone number and a query order of a query made to at least one server until a connection destination network for the telephone number is acquired; and the call processing unit that acquires a query order corresponding to a telephone number of an incoming-call destination specified in a call request from the destination resolution storage unit, makes a query to a server set at the end of the acquired query order to acquire a connection destination network for the telephone number of the incoming-call destination, and transmits the call request to the connection destination network.

As a result, in the present embodiment, it is possible to reduce the number of queries to determine a connection destination network and to reduce the load in call processing in a case where there are a plurality of query destination servers. Specifically, when the query destination server is not uniquely determined only by a telephone number at the time of IP interconnection, etc., the use of the destination resolution storage unit 13 in which the history of queries made to the query destination servers in the past is stored makes it possible to uniquely identify the query destination server and to make effective use of the resources of the call processing server.

In other words, if the order of queries made to the query destination server is fixed for each number system, it is not possible to achieve zero missed query, and it is difficult to reduce the number of queries. In this situation, in the present embodiment, the use of the history of queries made to the query destination server in the past may cause a missed query in the first call processing for each telephone number of the incoming-call destination but makes it possible to uniquely identify the query destination server and thus suppress the occurrence of a missed query. The first query is for the first call request for a telephone number that is not stored in the destination resolution storage unit 13, the first call request after the contracted telecommunications carrier is changed without changing the telephone number under the number portability system, or the like. As a result, in the present embodiment, it is possible to reduce the number of queries to determine the connection destination network and to make effective use of the resources of the call processing server.

Note that as the call processing server 1 described above, for example, a general-purpose computer system can be used including a CPU (Central Processing Unit, processor), a memory, a storage (HDD: Hard Disk Drive, SSD: Solid State Drive), a communication device, an input device, and an output device. In this computer system, each function of the call processing server 1 is implemented by the CPU executing a predetermined program loaded on the memory. Further, a program for the call processing server 1 can be stored in a computer-readable recording medium such as an HDD, SSD, USB memory, CD-ROM, DVD-ROM, or MO, or can be distributed via a network.

Further, the present invention is not limited to the above embodiment, and various modifications can be made within the spirit and scope of the invention.

REFERENCE SIGNS LIST

1 Call processing server
11 Call processing unit
12 Update unit
13 Destination resolution storage unit
2 HSS server
3 AS server
4 ENUM server
5 Gateway
6 SIP terminal

The invention claimed is:

1. A call processing server comprising:
   a destination resolution storage unit, including one or more processors, configured to store a telephone number and a query order of a query made to at least one server until a connection destination network for the telephone number is acquired; and
   a call processing unit, including one or more processors, configured to acquire a query order corresponding to a telephone number of an incoming-call destination specified in a call request from the destination resolution storage unit, make a query to a server set at an end of the acquired query order to acquire a connection destination network for the telephone number of the incoming-call destination, and transmit the call request to the connection destination network.

2. The call processing server according to claim 1, comprising an update unit, including one or more processors, configured to store an order of servers to which queries are made until the call processing unit acquires the connection destination network in a query destination order corresponding to the telephone number of the incoming-call destination of the destination resolution storage unit.

3. A call processing method implemented by a call processing server, the call processing server including a destination resolution storage unit that stores a telephone number and a query order of a query made to at least one server until a connection destination network for the telephone number is acquired, the call processing method comprising:
   an acquisition step of acquiring a query order corresponding to a telephone number of an incoming-call destination specified in a call request from the destination resolution storage unit; and
   a call processing step of making a query to a server set at an end of the acquired query order to acquire a connection destination network for the telephone number of the incoming-call destination, and transmitting the call request to the connection destination network.

4. The call processing method according to claim 3, comprising an update step of storing an order of servers to which queries are made until the connection destination network is acquired at the call processing step in a query destination order corresponding to the telephone number of the incoming-call destination of the destination resolution storage unit.

5. A non-transitory computer readable medium storing one or more instructions causing a computer to function as a call processing server including a destination resolution storage unit that stores a telephone number and a query order of a query made to at least one server until a connection destination network for the telephone number is acquired, the one or more instructions causing the computer to execute:
   an acquisition step of acquiring a query order corresponding to a telephone number of an incoming-call destination specified in a call request from the destination resolution storage unit and
   a call processing step of making a query to a server set at an end of the acquired query order to acquire a connection destination network for the telephone number of the incoming-call destination, and transmitting the call request to the connection destination network.

6. The non-transitory computer readable medium according to claim 5, wherein the one or more instructions further case the computer to execute:
   an update step of storing an order of servers to which queries are made until the connection destination network is acquired at the call processing step in a query destination order corresponding to the telephone number of the incoming-call destination of the destination resolution storage unit.

* * * * *